United States Patent

Poon et al.

[11] Patent Number: 5,838,145
[45] Date of Patent: Nov. 17, 1998

[54] TRANSIENT LOAD CORRECTOR FOR SWITCHING CONVERTERS

[76] Inventors: Franki Ngai Kit Poon; Chi Kong Tse, both of Flat G, 13/F, Block 1, Greenwood Terrace, Chai Wan, Hong Kong

[21] Appl. No.: 655,416

[22] Filed: May 30, 1996

[51] Int. Cl.⁶ ........................................................ G05F 1/40
[52] U.S. Cl. ........................... 323/266; 323/280; 323/268
[58] Field of Search .................................... 323/284, 285, 323/280, 266, 268

[56] References Cited

U.S. PATENT DOCUMENTS

| | | | |
|---|---|---|---|
| 4,218,647 | 8/1980 | Haas | 323/9 |
| 5,220,272 | 6/1993 | Nelson | 323/282 |
| 5,502,370 | 3/1996 | Hall et al. | 323/284 |

*Primary Examiner*—Shawn Riley

[57] ABSTRACT

The fast transient load corrector is a circuit that attaches to the output terminals of a switching converter. Requiring no feedback circuit that interacts with any control parameter of the switching regulator, the fast transient load corrector works independently to improve the transient response of any switching regulator. Effectively the fast transient load corrector combines with the actual load to form a slowly varying composite load which permits the switching converter to maintain a well regulated output voltage or a voltage of pre-defined waveform. The conceptual construction consists of a bi-directional controlled current source and either a voltage sensor or a current sensor. The voltage or current sensor measures the amount of load disturbance and triggers the bi-directional controlled current source to supply transient current to the load. The quantity to be sensed can be the output voltage, the rate of change of the output voltage, or the rate of change of the output current. A practical construction, in the case of voltage sensing, consists of a pair of comparators which determine the deviation of the output voltage from the nominal value and trigger the action of the bi-directional controlled current source to supply transient current to the load. A practical construction, in the case of current sensing, consists of a negative feedback operational amplifier which, with a first-order circuit and sensing resistor, limits the rate of change of the output current and triggers the action of the bi-directional controlled current source to supply transient current to the load.

22 Claims, 4 Drawing Sheets

TRANSIENT LOAD CORRECTOR FOR SWITCHING CONVERTERS

BACKGROUND OF THE INVENTION

This invention relates generally to switching converters, and more specifically to switching converters which serve as regulated or programmable voltage sources.

The performance of typical switching converters in respect of transient response is deemed not satisfactory in applications where high slew rates of output current are demanded. The usual approach to achieving output voltage regulation or programming is via the use of a feedback circuit which continuously adjusts a control parameter, such as the duty cycle, according to the amount of deviation of the output voltage from the nominal value or the predefined waveform. In this feedback approach, the mandatory requirement for stability of the feedback system imposes a limit to the speed of the transient response of the switching converter. The ability to respond to fast changing output current is sacrificed in exchange for a sufficient amount of stability margin. Although it is theoretically possible to achieve very fast transient response by operating the switching converter at a very high frequency, practical switching devices (which are available to date) impose a limit to the operating frequency. Consequently, switching converters employing feedback control for output regulation or programming can only cope with relatively slowly changing load current.

In the case of output voltage regulation, when the need arises for very fast transient response, a post-regulator is used which is invariably a linear regulator. Linear regulators, though having very fast transient response, continuously dissipate power, resulting in significant reduction of the overall power supply efficiency.

Low-voltage power supplies for integrated circuits, which encompass a wide range of applications including, inter alia, home computers and communication equipment, require slew rates of output current approaching 10 A/$\mu$s. Such a requirement is not met by practical switching regulators operating in the frequency range of 10 kHz to 500 kHz.

Since the transient response of a switching converter is limited by the operating frequency, there is a practical performance limit to which any feedback control scheme, however sophisticated, can ultimately achieve. Therefore, there is a need for new conceptual design as well as practical implementation that can provide very fast transient response for applications requiring high output current slew rates, without degradation of the overall efficiency of the power supply or programmable power source.

SUMMARY OF THE INVENTION

The load corrector (LdCr) is a circuit that attaches to the output terminals of a switching converter, and its function is to provide very fast transient recovery for the load. Together the LdCr and the load form a composite load for the switching converter. The LdCr is capable of responding to any fast changing load by supplying the necessary amount of transient current at a very high speed. The composite load, which is the effective load observed by the switching converter, is made to change sufficiently slowly such that the switching converter is able to provide a well regulated output voltage or a programmed output voltage. The approach is unconventional in the sense that no feedback scheme is employed to modulate any control parameter of the switching converter. The LdCr is independent of the switching converter, and hence can be designed and manufactured separately as a "plug-on" circuit.

Two different approaches to the implementation of the LdCr are based on voltage sensing and current sensing. In the case of voltage sensing, the output voltage of the load is sensed, and any minute difference between the sensed voltage and the nominal value or the pre-defined waveform will trigger, in zero time duration, a bi-directional controlled current source to inject the right amount of current to the load. Alternatively, the rate of fluctuation of the output voltage is sensed. In the event of fast changing load, a bi-directional controlled current source is triggered to inject the right amount of current to the load, the purpose being to limit the rate of fluctuation of the output voltage. The zero-time triggering is made possible by virtue of active devices in the absence of reactive elements. The output voltage will then be brought immediately back to the nominal value or the pre-defined waveform.

In the case of current sensing, the current supplying the composite load is sensed, and its rate of change is limited or controlled by the action of the LdCr such that the switching regulator is capable of providing well regulated or programmed output voltage. Thus, the LdCr serves to limit or control the rate of change of current demanded by the composite load as well as to supply current to the load at a very fast rate. The result is very fast transient response to the load.

The bi-directional controlled current source described above can be realized by solid state devices. A straightforward implementation involves a pair of transistors working in a complementary source-sink fashion. Specifically, one transistor is responsible for supplying transient current to the load and the other is responsible for sinking transient current from the load, under the command of a driving circuit. The type of transistors can be field-effect type or bipolar-junction type.

In short, the LdCr integrates with the load to produce a corrected load for the switching converter. The switching converter deals no longer with fast changing load, and hence can readily manifest itself as a "stiff" voltage source, maintaining either a well regulated output voltage or a pre-defined voltage waveform as required in the application concerned.

Unlike a linear regulator which continuously dissipates power, the LdCr consumes a very small amount of power. The LdCr is designed to supply extremely small current in the steady state when the load is constant. In the extreme event of an abrupt jump in load current demand, the LdCr supplies a current step momentarily to the load. The switching converter eventually supplies all of the load current, and the duration of time in which the LdCr supplies current is vanishingly small. Hence, with almost zero conduction time, the LdCr consumes very little power.

In summary, the following features distinguish the fast transient LdCr as a novel invention. Firstly, it is an independent circuit having no connection with any control parameter of the switching converter, and hence can be designed and manufactured separately. Secondly, the LdCr provides very fast transient response which cannot be achieved by any switching converter. The speed of the LdCr can be very fast, while that of the switching converter is bounded by the operating frequency. Thirdly, the LdCr offers very high efficiency due to negligible power dissipation in the steady state. Fourth, practical implementations can be in the form of custom integrated circuits. Thus, the LdCr can replace the existing series of linear regulators 7833, 7805, 7812, etc.

DESCRIPTION OF THE PREFERRED EMBODIMENTS

Figure 1:
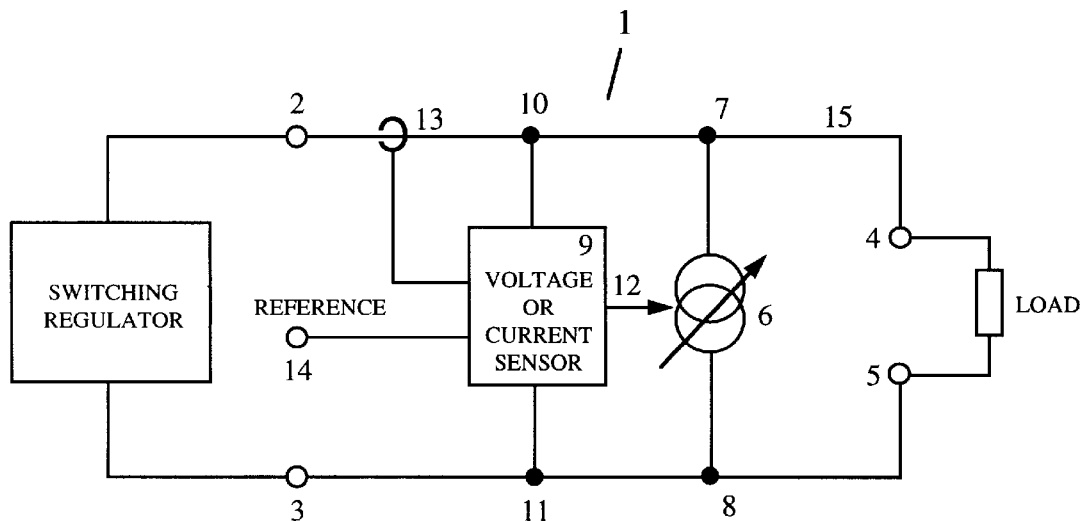
FIG. 1 is the schematic diagram of the load corrector showing the conceptual arrangement and the constituent functional elements.

The fast transient load corrector (LdCr) is conceptually embodied in FIG. 1. Terminals 2 and 3 are connected to the output of a switching converter, and, terminals 4 and 5 are connected to the load. The circuit comprises two basic functional elements, namely the sensor 9 and the bi-directional controlled current source 6. There are two general arrangements in which the sensor 9 can be used to detect the load change. In the first arrangement, the sensor 9 continuously observes the output voltage across terminals 10 and 11. By comparing the sensed voltage with a reference voltage or a programmed reference waveform which is either embedded in the sensor 9 or specified externally at the input terminal 14, any sudden load change can be observed. It is also possible to sense the rate of change of the voltage across terminals 10 and 11. The bi-directional controlled current source 6 is connected to terminals 7 and 8 which are directly connected to the load. The purpose of this bi-directional controlled current source is to supply current to the load under the command of the sensor 9. This bi-directional controlled current source ceases to supply current when the magnitude of the output voltage equals a reference level. Since the transient takes place in a very short duration of time, the whole process of restoring the output voltage is almost lossless. In the second arrangement, the sensor 9 senses the rate of change of the current that is being supplied by the switching converter. Line 13 is a possible location for sensing this current. In the event of a very abrupt load change, the sensor 9 is able to limit the rate of change of the output current of the switching regulator by commanding the bi-directional controlled current source 6 to inject the necessary amount of current to the load. Hence, the effective load seen by the switching converter becomes slowly changing. Specifically, when the switching converter is used to provide regulated output voltage, the sensor 9 maintains a low rate of change of the output current, thus enabling the switching converter to maintain good output regulation. When the switching converter is used to provide programmable voltage, the sensor 9 limits the rate of change of the output current by action of an appropriate filter network, consistent with the bandwidth of the voltage waveform. In both application scenarios, the fast transient of the load current in line 15 is entertained by the bi-directional controlled current source 6.

The bi-directional controlled current source 6 described above can be realized in practice by solid state devices. A straightforward implementation involves a pair of transistors working in a complementary source-sink fashion. Specifically, one transistor supplies current to the load and the other sinks current from the load, under the command of the sensor 9. The type of transistors can be field-effect type or bipolar-junction type.

Three preferred embodiments, each employing a different sensed quantity, are described in the following three paragraphs.

Figure 2A:
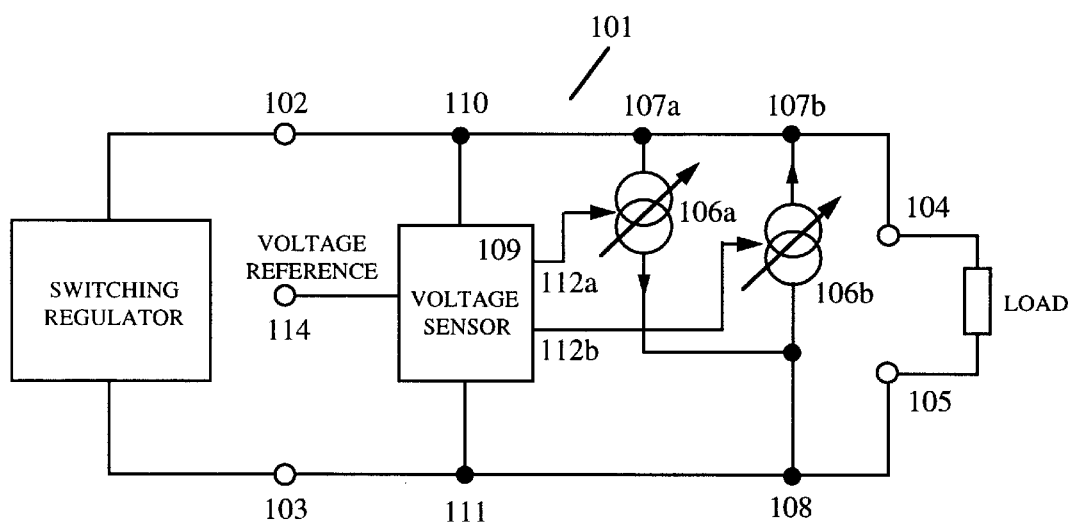
FIG. 2a is the schematic diagram of the load corrector employing voltage sensing and a pair of controlled current sources, the sensed quantity being the output voltage.

The preferred embodiment 101 of the voltage-sensing LdCr is shown in FIG. 2a, the sensed quantity being the value of the output voltage. Terminals 104 and 105 are connected to the load which can be very fast changing. Terminals 102 and 103 are connected to the output of a switching converter which is only capable of supplying transient current at a relatively low speed. In this embodiment, the value of the output voltage at node 110 is measured by the sensor 109. Terminal 114 is connected to either a DC voltage reference or a programmed voltage reference. The circuit contained in the sensor 109 compares the voltage at node 110 with the reference voltage at terminal 114, and sends out a driving signal to the control terminal of either the controlled current source 106a or 106b. Depending upon the sign and magnitude of the difference between the voltage at node 110 and that at terminal 114, either the controlled current source 106a or 106b would sink or supply transient current from or to terminals 104 and 105, in such a way that the output voltage across terminals 102 and 103 is kept close to the reference voltage at terminal 114. Under steady state condition (when the load is unchanged), moreover, the two controlled current sources 106a and 106b remain idle, neither supplying nor sinking current.

Figure 2B:
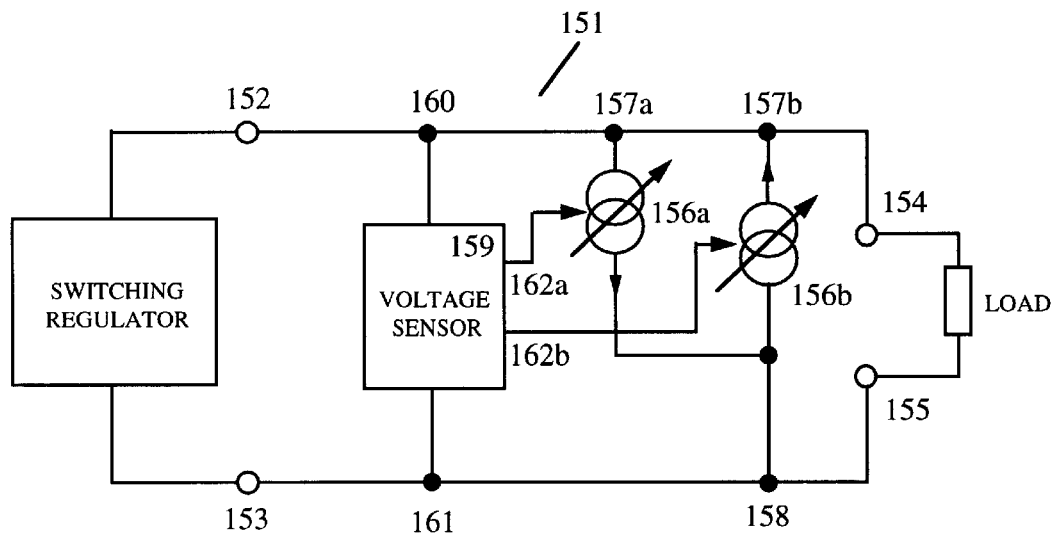
FIG. 2b is the schematic diagram of the load corrector employing voltage sensing and a pair of controlled current sources, the sensed quantity being the rate of change of the output voltage.

The preferred embodiment 151 of the voltage-sensing LdCr is shown in FIG. 2b, the sensed quantity being the rate of change of the output voltage. Terminals 154 and 155 are connected to the load which can be very fast changing. Terminals 152 and 153 are connected to the output of a switching converter which is only capable of supplying transient current at a relatively low speed. The quantity to be sensed is the rate of change of the voltage at node 160. The sensor 159 sends a driving signal to either the controlled current source 156a or 156b, in the event of any voltage fluctuation sensed at node 160. The purpose is to supply or sink fast transient current to or from the load, thereby presenting a slowly changing load to the switching converter and enabling the switching converter to maintain, across terminals 152 and 153, a well regulated DC voltage or any pre-defined voltage waveform. For this voltage-sensing approach, no voltage reference is needed and the switching converter is assumed to be able to provide regulated or programmed voltage by itself, under the condition of slowly changing load. The LdCr is here to cope with fast transient load.

Figure 3:
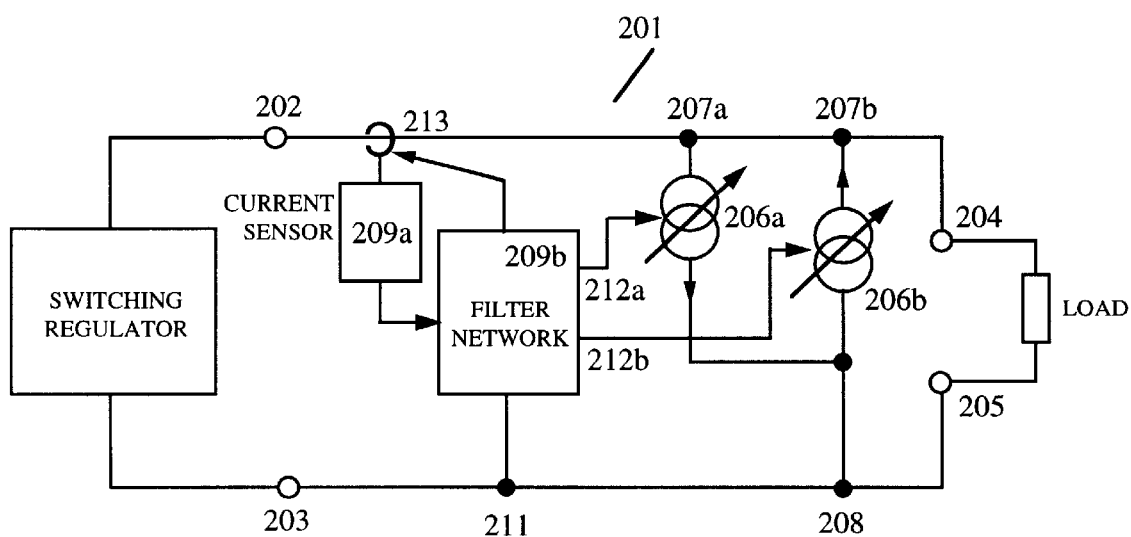
FIG. 3 is the schematic diagram of the load corrector employing current sensing and a pair of controlled current sources, the sensed quantity being the rate of change of the output current.

The preferred embodiment 201 of the current-sensing LdCr is shown in FIG. 3. Terminals 204 and 205 are connected to the load which can be very fast changing. Terminals 202 and 203 are connected to the output of a switching converter which is only capable of supplying transient current at a relatively low speed while providing well regulated output voltage or programmed voltage waveform. In this case, no DC voltage reference or programmed voltage reference is needed since the approach does not involve comparison of the sensed quantity with the reference. The LdCr comprises the current sensor 209a and the filter network 209b. The latter is used to limit the rate of change of the output current in line 213. In the case of the switching converter supplying a regulated voltage, the filter network 209b can be a simple first-order filter that forces the output current in line 213 to follow a first-order transient with any desired time constant. In the case of the switching converter supplying a programmed voltage, a filter of suitable bandwidth that is consistent with the programmed voltage waveform should be used instead. In either cases, the filter network 209b, in the event of fast load change, sends a driving signal to the control terminal of either the controlled current source 206a or 206b. The purpose is to supply or sink fast transient current to or from the load, thereby presenting a slowly changing load to the switching converter and enabling the switching converter to maintain, across terminals 202 and 203, a well regulated DC voltage or any pre-defined voltage waveform.

The controlled current sources described in the above embodiments 101, 151 and 201 can be realized in practice by solid state devices. Specifically, an n-channel field effect transistor or an NPN bipolar junction transistor may be used to realize any of the controlled current sources 106a, 156a and 206a. Also, a p-channel field effect transistor or an PNP bipolar junction transistor may be used to realize any of the controlled current sources 106b, 156b and 206b.

Two particular practical embodiments are described in the following two paragraphs. They correspond to two different sensing approaches.

Figure 4:
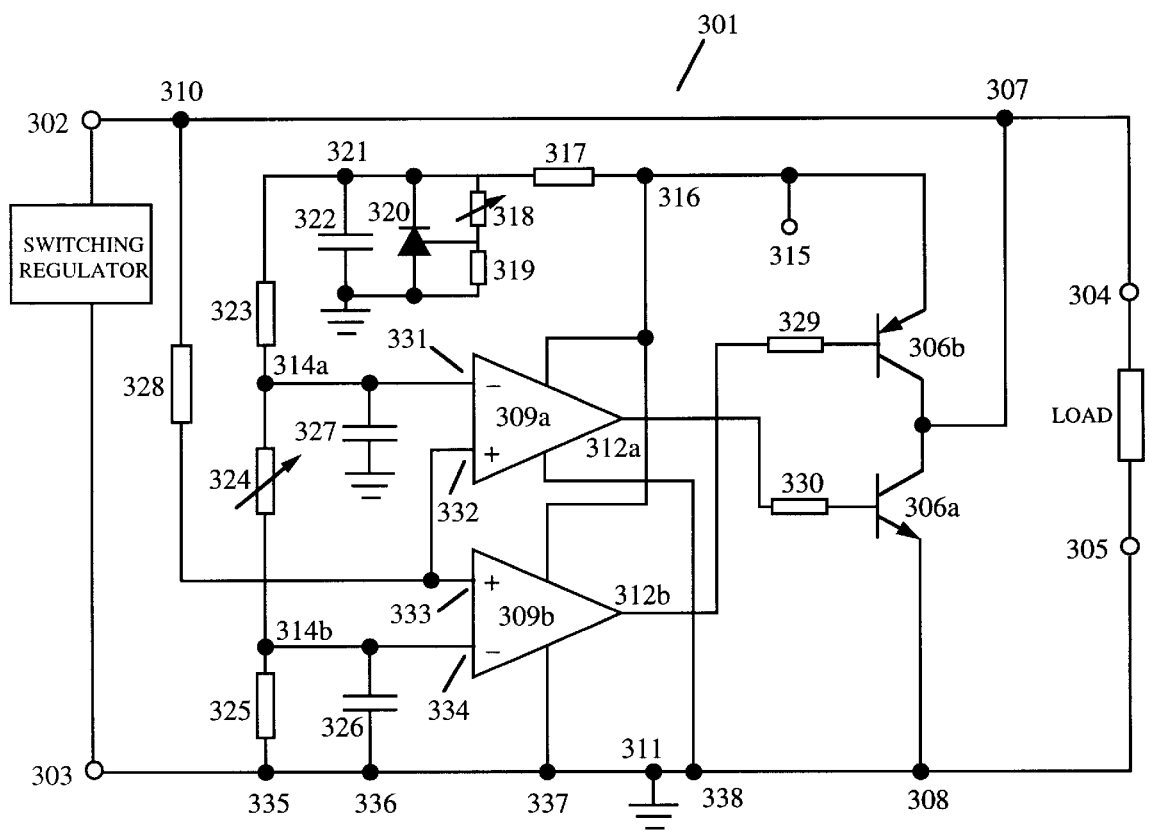
FIG. 4 is the circuit diagram of a practical voltage-sensing load corrector, showing the actual physical connections to the load and the switching regulator.

The first practical embodiment 301 of the LdCr is shown in FIG. 4. Terminals 304 and 305 are connected to the load which can be very fast changing. Terminals 302 and 303 are connected to the output of a switching regulator which is only capable of supplying transient current at a relatively low speed. Terminal 315 is connected to a DC voltage source, which can be generated from an auxiliary output of the switching regulator and does not have to be; well regulated. The functions of this voltage source, at terminal 315, are: (1) to power up the operational amplifiers 309a and 309b; (2) to provide voltage reference for comparison with the voltage across the load; (3) to serve as a source from which transient current can be derived to satisfy any abrupt load change. A fixed voltage reference is created at node 321 by action of the programmable voltage referencing device 320. The capacitor 322 enhances the stability of this voltage reference at 321. Consequently, fixed voltage references are created at nodes 314a and 314b, which are enhanced by the capacitors 327 and 326. The value of the voltage reference at 314a is slightly above the nominal output voltage, whereas that at 314b is slightly below the nominal output voltage. The difference between the two voltage references at 314a and 314b defines a tolerance band within which the output voltage is allowed to fluctuate. The width of this tolerance band can be adjusted by varying the value of variable resistor 324. The two operational amplifiers 309a and 309b serve as comparators. The inputs to the operational amplifier 309a are the voltage reference 314a and the output voltage 310 of the switching regulator. The output of the operational amplifier 309a directly drives the NPN transistor 306a. When the output voltage 310 is above the reference 314a due to a reduced load current demand, the NPN transistor 306a is triggered to sink current from the load at terminal 307 to ground 308, thereby restoring the voltage across the load (i.e. across terminals 304 and 305) back to the nominal value. Likewise, the inputs to the operational amplifier 309b are the voltage reference 314b and the output voltage 310 of the switching regulator. The output of the operational amplifier 309b directly drives the PNP transistor 306b. When the output voltage 310 is below the reference 314b due to an increased load current demand, the PNP transistor 306b is triggered to supply current from the source 315 to the load at terminal 307, thereby restoring the voltage across the load (i.e., across terminals 304 and 305) back to the nominal value.

Figure 5:
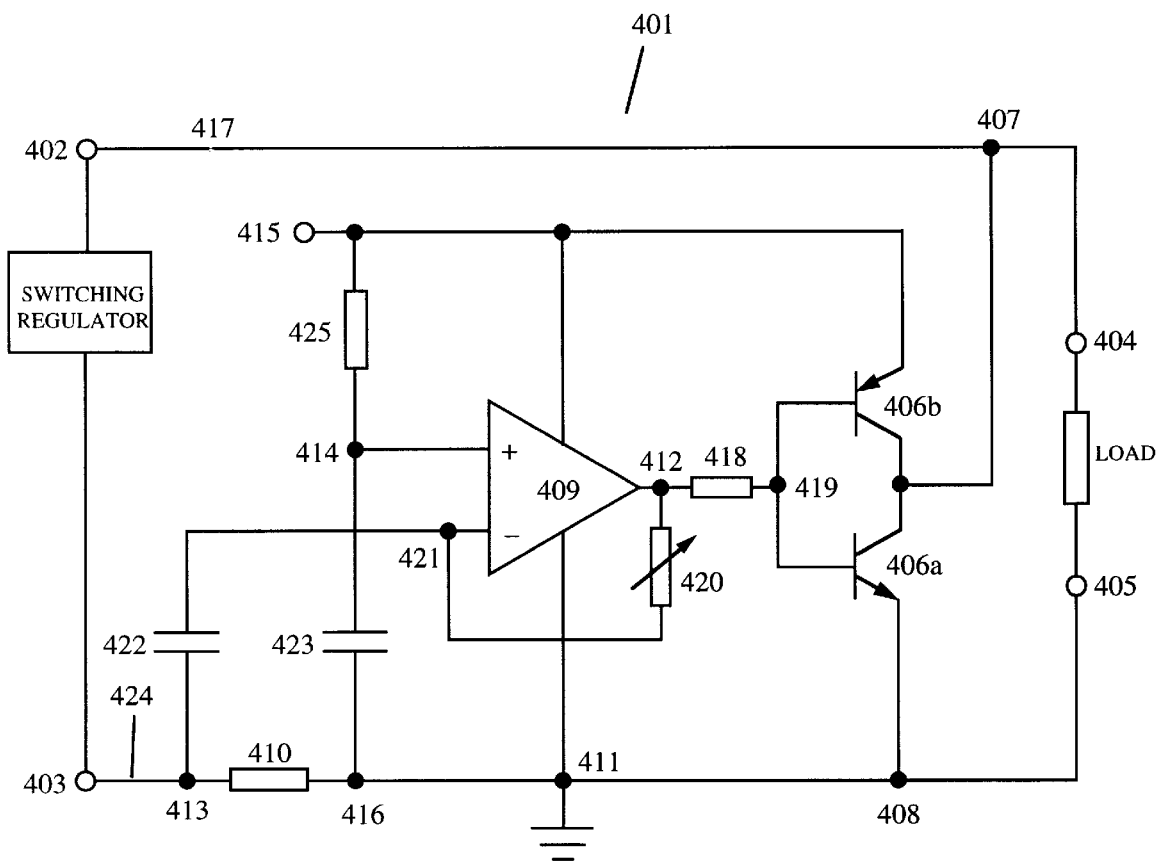
FIG. 5 is the circuit diagram of a practical current-sensing load corrector, showing the actual physical connections to the load and the switching regulator.

The second practical embodiment 401 of the LdCr is shown in FIG. 5. Terminals 404 and 405 are connected to the load which can be very fast changing. Terminals 402 and 403 are connected to the output of a switching regulator which is only capable of supplying transient current at a relatively low speed. Two main aspects of operation of this LdCr are: (1) to limit the rate of change of the output current in line 417 (or equivalently 424) so that the switching regulator can comfortably provide voltage regulation; (2) to supply fast transient current to the load. Terminal 415 is connected to a voltage source which does not require good regulation and whose purposes are to power up the operational amplifier 409 and to serve as a source from which transient current can be supplied to the load. The first aspect of operation mentioned above requires knowledge of the rate of change of the output current in line 424. Since this current always flows through the resistor 410, it is possible to measure the rate of change of this current by measuring the voltage across the resistor 410. By Ohm's law, the current flowing through the resistor 410 is equal to the voltage across the resistor 410 multiplied by the value of the resistance. In order to limit the rate of change of the current flowing in the resistor 410, the voltage across nodes 416 and 413 is forced to vary at a rate determined by a first-order circuit comprising the resistor 416, the capacitor 422 and the capacitor 423. The potential at node 414 is equal to that at node 421, by virtue of the high gain of the operational amplifier 409 which is connected in a negative feedback configuration. Therefore, the capacitors 422 and 423, and the resistor 410 form a closed voltage loop. The value of the capacitor 423 is comparatively large, and the capacitor 423 serves essentially as a fixed voltage source. Since the rate of change of voltage of the capacitor 423 is zero, the rate of change of the voltage across the resistor 410 must be equal to that of the capacitor 422. Consequently, the output current in line 424 can only vary according to a first-order transient waveform, the time constant of which being equal to the product of the value of the capacitor 422 and the equivalent resistance observed at node 421 which comprises mainly the resistor 420. The larger the value of this time constant, the lower the rate of change of the current demanded from the switching regulator. The other aspect of operation is the injection of transient current to the load, in the event of rapidly changing load. The negative input 421 of the operational amplifier 409 is connected to the output 412 via the resistor 420. When there is a change in the current in line 424, the voltage at node 421 will tend to move, and transient current will flow through the resistor 410. Depending on the direction of this transient current, either the NPN transistor 406a will sink transient current from terminal 407, or the PNP transistor 406b will supply transient current to terminal 407. The sinking or supplying of transient current from the transistors 406a or 406b is determined by the sign of the rate of change of the current in line 424. When less current is demanded, i.e., negative rate of change of current goes from node 416 to node 413, the sinking action of the transistor 406a takes place. Otherwise, the supplying action of the transistor 406b takes place. The consequence is, that any rapid change in the load current will be very quickly responded by the transistors 406a and 406b, while the rate of change of the current demanded from the switching regulator is maintained sufficiently low.

In summary, six embodiments of the LdCr are described above, namely the conceptual embodiment 1 of the LdCr, the preferred embodiment 101 of the voltage-sensing LdCr, the preferred embodiment 151 of the voltage-rate-sensing LdCr, the preferred embodiment 201 of the current-sensing LdCr, the practical embodiment 301 of a voltage-sensing LdCr, and the practical embodiment 401 of a current-sensing LdCr. All these embodiments share the following important novel features. Firstly, the LdCr involves no feedback circuit that interacts with any control parameter of the switching converter. This permits the LdCr to work independently to improve the transient response of any power supply. Thus, the LdCr can be designed and manufactured separately. Secondly, the transient recovery for the load is instant. This is not achievable by switching regulators operating in all practical frequencies. Thirdly, the power loss of the LdCr is very low due to the fact that the LdCr supplies no current to the load in the steady state. In stark contrast, the linear regulator continuously dissipates power at all times. Hence, the LdCr can replace the linear regulator in applications requiring very fast transient response and high efficiency. Fourth, the LdCr can be practically implemented in the form of custom integrated circuits (IC) which can replace the existing series of IC regulators 7833, 7805, 7812, etc.

Prototypes of the practical circuits have been constructed using the following discrete components and circuit parameter values. For both circuits of FIGS. 4 and 5, the NPN transistor is MJE15030, and the PNP transistor is MJE15031. All operational amplifiers are high speed 5532 op-amps. All other components used are as listed below:

| | |
|---|---|
| Resistor 317: | 220 Ω |
| Resistors 329 and 330: | 560 Ω |
| Resistor 318: | 4 kΩ |
| Resistor 319: | 560 Ω |
| Resistor 323: | 300 Ω |
| Resistor 324: | 200 Ω |
| Resistor 325: | 1.8 kΩ |
| Resistor 328: | 680 Ω |
| Capacitors 322, 326 and 327: | 1 μF |
| Device 320: | TL431 (programmable precision reference) |
| Resistor 425: | 33 kΩ |
| Resistor 418: | 110 Ω |
| Resistor 420: | 50 kΩ |
| Resistor 410: | 0.27 Ω |
| Capacitor 423: | 10 μF |
| Capacitor 422: | 1 μF |

Experimental measurements have been performed to verify the function of the two load corrector circuits. The switching regulator used in both cases was the Motorola MC34167 voltage-mode buck converter module, the nominal output voltage being 12 V. The load changed abruptly from 8 Ω to 120 Ω. Without the load corrector circuit, the output voltage of the switching regulator was shown to experience an overshoot of 1.5 V during the transient, and the settling time was about 10 ms. When the voltage-sensing LdCr (FIG. 4) was used, the output voltage stayed almost constant, with a fluctuating band which could be set as narrow as one wished by adjusting the resistor 46. When the current-sensing LdCr (FIG. 5) was used, the output voltage stayed almost constant. The overshoot was as small as 0.1 V, and the transient time was as short as 0.05 ms.

What is claimed is:

1. A circuit for providing fast transient response for a switching regulator, the circuit being unconnected to any pulse-width modulator of the switching regulator and comprising:

a first input terminal and a second input terminal for connection to a switching regulator;

a first output terminal and a second output terminal for connection to a load;

a third input terminal for connection to a DC voltage reference or a programmable voltage reference;

a voltage sensor for detecting the value of the output voltage of the switching regulator;

a bi-directional controlled current source for supplying transient current to the load connected to the first and second output terminals, with the bi-directional controlled current source dissipating negligible power in the steady state;

a control circuit for controlling the bi-directional controlled current source according to the amount of deviation of the output voltage from the DC reference or the programmed voltage reference, thereby ensuring the right amount of transient current to be supplied to or sunk from the load.

2. A circuit for providing fast transient response for a switching regulator, the circuit being unconnected to any pulse-width modulator of the switching regulator and comprising:

a first input terminal and a second input terminal for connection to a switching regulator;

a first output terminal and a second output terminal for connection to a load;

a voltage sensor for detecting the rate of change of the output voltage of the switching regulator;

a bi-directional controlled current source for supplying transient current to the load connected to the first and second output terminals, with the bi-directional controlled current source dissipating negligible power in the steady state;

a control circuit for controlling the bi-directional controlled current source according to the fluctuation of the output voltage measured by the voltage sensor, thereby ensuring the right amount of transient current to be supplied to or sunk from the load.

3. A circuit for providing fast transient response for a switching regulator, the circuit being unconnected to any pulse-width modulator of the switching regulator and comprising:

a first input terminal and a second input terminal for connection to a switching regulator;

a first output terminal and a second output terminal for connection to a load;

a current sensor for detecting the rate of change of the output current of the switching regulator;

a bi-directional controlled current source for supplying transient current to the load connected to the first and second output terminals, with the bi-directional controlled current source dissipating negligible power in the steady state;

a control circuit for controlling the bi-directional controlled current source according to the fluctuation of the output current measured by the current sensor, thereby ensuring the right amount of transient current to be supplied to or sunk from the load;

a filter network for limiting the rate of change of the output current, the bandwidth of which being wide enough to permit the output current to vary in accordance with the output voltage waveform.

4. The circuit of claim 1 wherein the output voltage of the switching regulator follows, at all times, the same value as the voltage at the third input terminal, under the condition of fast changing load.

5. The circuit of claim 1 wherein the bi-directional controlled current source comprises two controlled current sources, one responsible for sinking transient current from and the other for sourcing transient current to the load that is connected to the output terminals.

6. The circuit of claim 2 wherein the voltage across the load follows, at all times, a well regulated voltage or any programmed voltage determined by the switching regulator, under the condition of fast changing load.

7. The circuit of claim 2 wherein the bi-directional controlled current source comprises two controlled current sources, one responsible for sinking transient current from and the other for sourcing transient current to the load that is connected to the output terminals.

8. The circuit of claim 3 wherein the voltage across the load follows, at all times, a well regulated output voltage or any programmed output voltage determined by the switching regulator, under the condition of fast changing load.

9. The circuit of claim 3 wherein the bi-directional controlled current source comprises two controlled current sources, one responsible for sinking transient current from and the other for supplying transient current to the load that is connected to the output terminals.

10. The circuit of claim 3 wherein the output current, by action of the filter network, varies slowly enough that the switching regulator can provide a well regulated output voltage or any programmed output voltage determined by the switching regulator.

11. A circuit for providing fast transient response for a the switching regulator, the circuit being unconnected to any pulse-width modulator of the switching regulator and comprising:
- a first input terminal and a second input terminal for connection to a switching regulator;
- a first output terminal and a second output terminal for connection to a load;
- a voltage sensor for detecting the variation of the output voltage of the switching regulator;
- a current source for supplying transient current to and a current sink for sinking transient current from the load that is connected to the first and second output terminals, with both current source and sink dissipating negligible power in the steady state;
- a control circuit for controlling the current source and the current sink, according to the variation of the output voltage, thereby ensuring the right amount of transient current to be supplied to or sunk from the load;
- a third input terminal connecting to a DC voltage source for maintaining functioning power of the circuit and a plurality of DC reference voltages.

12. The circuit of claim 11, further comprising:
- a first controlled current source serving as the current source and a second controlled current source serving as the current sink;
- a first comparator driving the first controlled current source and a second comparator driving the second controlled current source;
- a first voltage-sensing line connecting the first input terminal to the positive input of the first comparator and to the positive input of the second comparator;
- a first resistor inserted in the first voltage-sensing line;
- a first output line delivering current from the first and second controlled current sources to the first output terminal;
- a programmable precision reference device being connected to the third input terminal and configured to provide a first stable DC reference voltage;
- a resistive ladder network being connected to the first stable DC reference voltage and providing second and third DC reference voltages;
- a ground line connecting the second input terminal and the second output terminal.

13. The circuit of claim 12 wherein the absolute values of the second and the third DC reference voltages are set by adjusting the level of the first DC reference voltage, and are close to a pre-defined nominal output voltage, the second DC reference voltage is slightly higher than the third DC reference voltage, and, the difference between the second and the third DC reference voltages is adjustable by varying the value of a resistor within the resistive ladder network.

14. The circuit of claim 12, further comprising:
- a first output line connecting the output of the first comparator with the control terminal of the first controlled current source;
- a second output line connecting the output of the second comparator with the control terminal of the second controlled current source;
- a first input line connecting the second DC reference voltage to the negative input of the second comparator;
- a second input line connecting the third DC reference voltage to the negative input of the first comparator.

15. The circuit of claim 12, further comprising:
- a first capacitor connected between the first DC reference voltage and the ground line for stabilizing the value of the first reference voltage;
- a second capacitor connected between the second DC reference voltage and the ground line for stabilizing the value of the second DC reference voltage;
- a third capacitor connected between the third DC reference voltage and the ground line for stabilizing the value of the third DC reference voltage.

16. The circuit of claim 12 wherein the output of the first comparator goes low and the output of the second comparator goes high when the voltage of the first voltage-sensing line is lower than the third DC reference voltage, causing the first controlled current source to supply current while preventing the second controlled current source from sinking current.

17. The circuit of claim 12 wherein the output of the first comparator goes low and the output of the second comparator goes high when the voltage of the first voltage-sensing line is higher than the second DC reference voltage, preventing the first controlled current source from supplying current while causing the second controlled current source to sink current.

18. The circuit of claim 12 wherein the output of the first comparator goes high and the output of the second comparator goes low when the voltage of the first voltage-sensing line is lying between the second and the third DC reference voltages, preventing both controlled current sources from supplying or sinking current.

19. A circuit for providing fast transient response for a switching regulator, the circuit being unconnected to any pulse-width modulator of the switching regulator and comprising:
- a first input terminal and a second input terminal for connection to a switching regulator;
- a first output terminal and a second output terminal for connection to a load;
- a current sensor for detecting the variation of the output current of the switching regulator;
- a current source for supplying transient current to and a current sink for sinking transient current from the load that is connected to the first and second output terminals, with both current source and sink dissipating negligible power in the steady state;

a control circuit for controlling the current source and the current sink according to the variation of the output current, thereby ensuring the right amount of transient current to be supplied to or sunk from the load;

a third input terminal connecting to a DC voltage source for maintaining functioning power of the circuit.

20. The circuit of claim 19, further comprising:

a first controlled current source serving as the current source and a second controlled current source serving as the current sink;

a first operational amplifier driving the first controlled current source and the second controlled current source;

a first current-sensing resistor connecting the second input terminal and the second output terminal;

a first output line delivering current from the first and second controlled current sources to the first output terminal;

a ground line connecting the current-sensing resistor and the second output terminal;

a first capacitor of large value connecting the positive input of the first operational amplifier and the ground line;

a second capacitor connecting the negative input of the first operational amplifier and the second input terminal;

a first resistor connecting the third input terminal and the positive input of the first operational amplifier;

a first control line connecting the output of the first operational amplifier to the control terminal of the first controlled current source and to the control terminal of the second controlled current source;

a second resistor inserted in the first control line;

a first variable resistor inserted between the output and the negative input of the first operational amplifier.

21. The circuit of claim 20 wherein the rate of change of the voltage across the first current-sensing resistor is aligned with the rate of change of the voltage across the second capacitor, thereby limiting the rate of change of the current flowing through the first current-sensing resistor.

22. The circuit of claim 20 wherein, through action of the first operational, amplifier configured in negative feedback, fast transient current is supplied by the first controlled current source to the first output terminal when a negative rate of change of the current in the first current-sensing resistor is detected, and, fast transient current is sunk by the second controlled current source from the first output terminal when a positive rate of change of the current in the first current-sensing resistor is detected.

* * * * *